United States Patent
Muller et al.

(10) Patent No.: US 12,455,365 B2
(45) Date of Patent: Oct. 28, 2025

(54) MANIPULATION OF RADAR READINGS

(71) Applicant: XMOS LTD, Bristol (GB)

(72) Inventors: Hendrik Lambertus Muller, Cumbria (GB); Douglas Roger Pulley, Bath (GB)

(73) Assignee: XMOS LTD, Bristol (GB)

( * ) Notice: Subject to any disclaimer, the term of this patent is extended or adjusted under 35 U.S.C. 154(b) by 287 days.

(21) Appl. No.: 18/037,153

(22) PCT Filed: Aug. 26, 2021

(86) PCT No.: PCT/EP2021/073586
§ 371 (c)(1),
(2) Date: May 16, 2023

(87) PCT Pub. No.: WO2022/122195
PCT Pub. Date: Jun. 16, 2022

(65) Prior Publication Data
US 2023/0417896 A1     Dec. 28, 2023

(30) Foreign Application Priority Data

Dec. 9, 2020 (GB) .................................. 2019402

(51) Int. Cl.
    *G01S 13/58*     (2006.01)
    *G01S 13/42*     (2006.01)
    *G01S 13/89*     (2006.01)

(52) U.S. Cl.
    CPC .......... *G01S 13/584* (2013.01); *G01S 13/426* (2013.01); *G01S 13/89* (2013.01)

(58) Field of Classification Search
    CPC ........ G01S 7/417; G01S 13/584; G01S 7/356; G01S 13/343; G01S 13/42; G01S 13/426; G01S 13/89; G01S 13/931
See application file for complete search history.

(56) References Cited

U.S. PATENT DOCUMENTS 11,062,454 B1 *   7/2021   Cohen .................... G01S 7/417
11,391,819 B2 *   7/2022   Sarkis .................... G01S 7/417
(Continued)

FOREIGN PATENT DOCUMENTS

| WO | 2020/005943 A1 | 1/2020 |
| WO | 2020/113160 A2 | 6/2020 |
| WO | 2020/113166 A2 | 6/2020 |

OTHER PUBLICATIONS

Nambiar Nikhil Vasudev et al., "Automatic Landmine Detection by Pattern Trace", 2017 International Conference on Computing, Communication, Control and Automation (ICCUBEA), IEEE, 2017, 6 pages.
(Continued)

*Primary Examiner* — Peter M Bythrow
(74) *Attorney, Agent, or Firm* — Sughrue Mion, PLLC

(57) ABSTRACT

A system comprising: a radar sensor configured to produce a set of radar readings distributed amongst a plurality of distance bins; an image projection module configured to project at least some of the radar readings onto an image comprising a 2D Cartesian grid of pixels based on the respective azimuth angles and elevations, wherein for each pixel where a radar reading is present the pixel comprises a respective value of at least one non-binary channel comprising at least one of measured property of the radar reading; and a machine learning model for image recognition, arranged to receive the image and to detect an object therein, wherein the machine learning model is configured to perform the detection based on at the values of the at least one non-binary channel for each pixel.

20 Claims, 6 Drawing Sheets

(56) References Cited

U.S. PATENT DOCUMENTS

| | | | | |
|---|---|---|---|---|
| 11,625,009 | B2* | 4/2023 | Buerkle | G01S 17/86 |
| | | | | 702/181 |
| 11,663,726 | B2* | 5/2023 | Das | G06T 7/20 |
| | | | | 701/28 |
| 11,816,852 | B2* | 11/2023 | Lee | G06T 7/521 |
| 12,125,237 | B2* | 10/2024 | Matsunaga | G06V 20/56 |
| 2019/0240535 | A1 | 8/2019 | Santra et al. | |
| 2019/0384303 | A1* | 12/2019 | Muller | G06N 20/00 |
| 2019/0391251 | A1* | 12/2019 | Bharadwaj, Jr | G01S 13/42 |
| 2020/0210726 | A1* | 7/2020 | Yang | G06V 10/70 |
| 2020/0233429 | A1* | 7/2020 | Zhang | G01S 13/865 |
| 2020/0300970 | A1* | 9/2020 | Nguyen | G01S 13/88 |
| 2021/0255304 | A1* | 8/2021 | Fontijne | G06V 20/10 |
| 2022/0153262 | A1* | 5/2022 | Gallo | G01S 7/417 |

OTHER PUBLICATIONS

Qisong Wu et al., "Radar-based Fall Detection Based on Doppler Time-Frequency Signatures for Assisted Living", IET Radar Sonar & Navigation, 2015, pp. 164-172, vol. 9, Iss. 2.
International Search Report of PCT/EP2021/073586 dated Dec. 6, 2021 [PCT/ISA/210].
Written Opinion of PCT/EP2021/073586 dated Dec. 6, 2021 [PCT/ISA/237].
British Search Report of No. 2019402.3 dated May 26, 2021.
Joseph B. Keller, "Geometrical Theory of Diffraction", Journal of the Optical Society of America, 1962, pp. 116-130, vol. 52, No. 2.

* cited by examiner

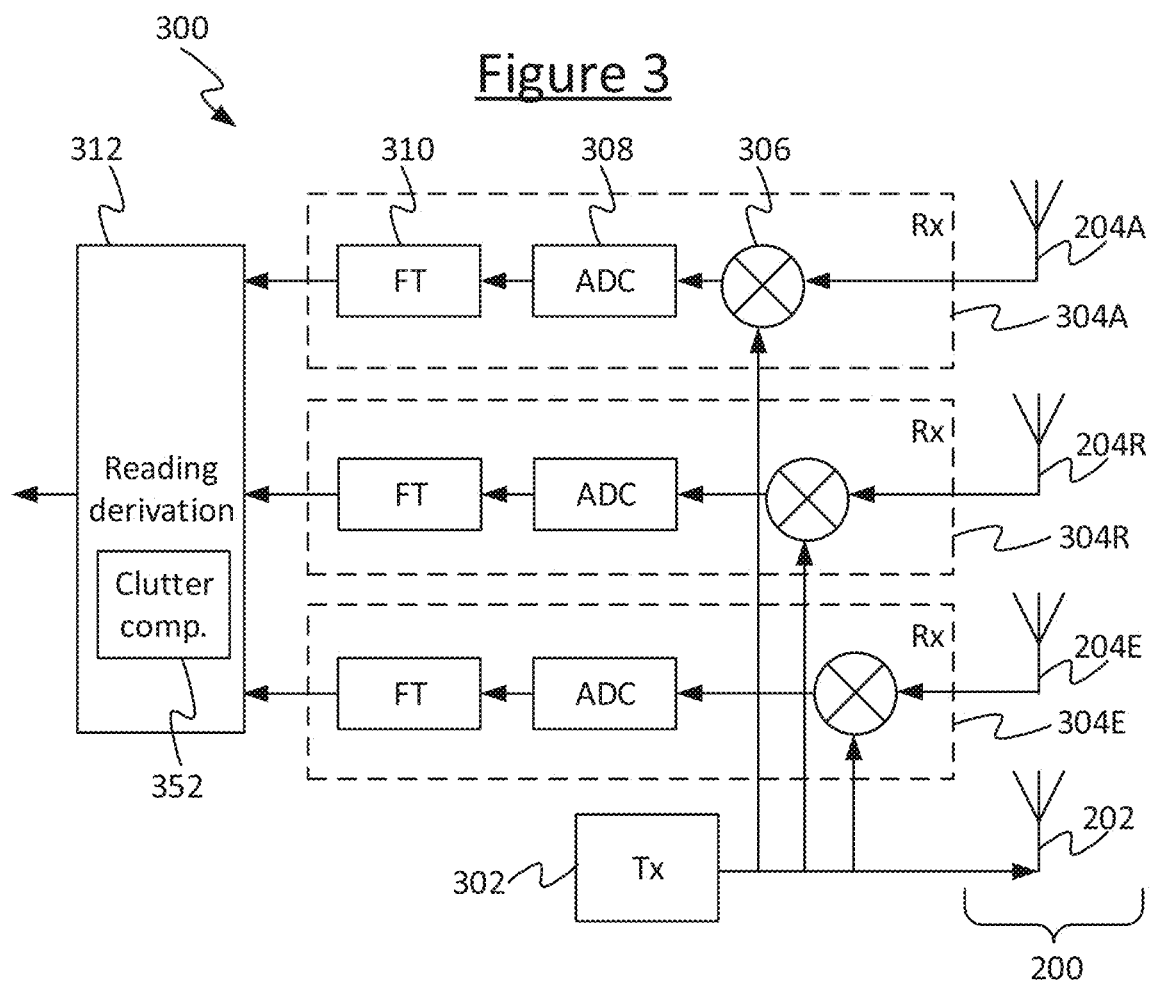

MANIPULATION OF RADAR READINGS

CROSS REFERENCE TO RELATED APPLICATIONS

This application is a National Stage of International Application No. PCT/EP2021/073586 filed on Aug. 26, 2021, claiming priority based on British Patent Application No. 2019402.3 filed on Dec. 9, 2020.

TECHNICAL FIELD

The present disclosure relates to transformation of a set of 3D radar readings for input to a machine learning model.

BACKGROUND

Radar systems in general are designed to detect and measure parameters of a "target" through transmitting known RF waveforms and then receiving and processing the signals reflected back from the target. All received signal levels depend on the "radar cross section" (RCS) of the object, target or clutter. The RCS is a joint measure of reflectivity and effective surface area. It is effectively the composite of one or more scattering centres (Joseph B. Keller, "Geometrical theory of diffraction", Journal of the Optical Society of America, 52(2):116-130, February 1962). These are viewed as point sources on the reflecting surface and, given suitable receive antenna array geometries, the position of these can be estimated in 3D space by comparison of received phase and the estimate of range to the scattering centre (its transmission time delay). This can yield a set of received intensities at co-ordinates for each radar measurement or "chirp".

Frequency modulated continuous wave (FMCW) radar sensors do not produce a measurement for each direction, but instead produce a measurement for each distance. For example, a radar sensor may have 128 or 256 distance bins. Each distance bin represents a different distance at which the radar sensor can potentially detect an object based on the reflection of the radar signal from that object. For each distance bin the radar sensor reports an azimuth, an elevation, and a strength of the reflection (as there is only one azimuth, elevation and strength measurement for each distance bin, then two objects will "obscure" each other if they are at the same distance from the sensor, even if located in different directions from the sensor—the reading will actually be the sum of the responses from the two objects). A pulsed radar with multiple antennas could be made to work in the same way.

SUMMARY

It would be desirable to use the measurements from a radar sensor as inputs to a machine learning model such as a neural network. However, such models are typically designed for image recognition based on 2D images.

According to one aspect disclosed herein, there is provided a system comprising: a radar sensor configured to emit a radar signal and receive back reflections thereof, and thereby produce a set of radar readings distributed amongst a plurality of distance bins each corresponding to a different respective distance of reflection, wherein in each distance bin that contains a radar reading, the radar reading comprises at least a respective azimuth angle and elevation of the radar reading. The system further comprises an image projection module configured to project at least some of the radar readings onto an image comprising a 2D Cartesian grid of pixels based on the respective azimuth angles and elevations, wherein for each pixel where a radar reading is present the pixel comprises a respective value of at least one non-binary channel comprising at least one of measured property of the radar reading. The system also comprises a machine learning model for image recognition, arranged to receive the image and to detect an object therein, wherein the machine learning model is configured to perform the detection based on at the values of the at least one non-binary channel for each pixel.

For example, the at least one measured property of the radar reading comprises one, more or all of: i) the respective distance of the radar reading, ii) a signal strength of the received reflection which produced the radar reading, and/or iii) a motion measurement comprising a speed or velocity of a surface from which the radar signal was reflected to produce the radar reading.

Another issue with radar sensors is that the results are typically quite sparse compared to conventional, optically-generated images. For instance consider a radar sensor with 128 or 256 distance bins, only a fraction of which may actually be occupied with measurements of an actual reflection from a detected target. If these bins are projected onto a 2D Cartesian pixel grid—even a relatively small grid of, say, 32×32 (=1024) pixels—then only a small number of pixel positions will be occupied by radar measurements. As such, radar images do not conventionally work well with image recognition algorithms.

It would be desirable to improve the amount of information in an image generated from a set of radar readings for the purpose of image recognition.

To address this, each pixel in the image comprises a respective value of a binary channel comprising a binary indicator, wherein the binary indicator is asserted if the pixel contains one of the radar readings but not asserted otherwise, or the binary indicator is asserted if the radar reading contains a radar reading above a noise floor but not asserted if the pixel contains a radar reading below the noise floor. The machine learning model may be configured to perform the detection based on at the values of the binary and non-binary channels for each pixel, including pixels with both asserted and non-asserted values of the binary channel.

The disclosed technique generates an image with a number of channels per pixel: conventional channels of depth, strength and/or motion, but also an additional binary channel which records whether a radar measurement is present or not. The idea is based on the recognition that a measurement of zero distance or motion is not the same as no measurement (a distance, strength or motion measurement that results from an actual reflection from a target, but that quantizes to zero, is still a measurement, whereas an empty bin due to no reflection in that bin is not). Simply naively converting the 3D radar data to a 2D image would result in zero-measurements and points with no measurement both simply being represented by a zero pixel value in the same channel. Or considering the signal strength channel (a measure of received energy of a reflection), a pixel with no reading would be allocated zero value whilst a weak signal would be allocated a value that is almost zero. However, the different between no reading, and on the other hand a weak reading that is nonetheless present, is potentially significant. In the naïve approach, pixels with zero distance and motion and weak signal strength may be treated by the machine learning model as similar to pixels with no measurement. But by including extra information about this distinction in the image, the machine learning model can learn how this effects the image recognition. The inventors have found that this can improve the accuracy and speed of radar-based image recognition using "off-the-shelf" image recognition models, for example in the application of people detection where the detected object is a person.

Another factor relating to the sparsity issue is the choice of size (resolution) of pixel grid onto which the radar readings are projected (i.e. the spatial quantization of the image). Too many pixels and the image will be very sparse. But too few, detail will be lost and all objects will start to look the same. For a typical radar sensor with 128 distance bins, or more generally between 64 and 256 bins, the inventors have found a "sweet spot" for converting radar to 2D images, whereby the pixel grid is between 16×16 and 128×128 pixels. More preferably it is between 32×32 and 64×64. This is particularly applicable when used in applications for detecting humans in the range of 1-5 m from the sensor It could also be between 16×16 and 64×64, or between 32×32 and 128×128. Other ranges are possible. Also the grid does not have to be square. Nor do the dimensions necessarily have to be powers of 2.

In further embodiments, the system may comprise a clutter compensation stage arranged to remove clutter from the set of radar readings before input to the image projection module to produce said image.

In an example implementation, the radar sensor may comprise: a reference receiver, azimuth receiver and elevation receiver, and a respective transform block arranged to determine a spectrum of the reflections detected by each; a clutter compensation stage arranged, for each receiver, to determine a time-averaged version of the spectrum and subtract from a current, uncompensated instance of the spectrum to generate a compensated spectrum; and a reading derivation stage arranged to determine the azimuth angles of the readings by comparing the compensated spectrums of the azimuth receiver and reference receiver, to determine the elevations of the readings by comparing the compensated spectrums of the elevation receiver and reference receiver, and to determine the one or more measured properties based on one, more or all of the compensated spectrums.

In some embodiments employing clutter compensation, the binary indicator may be asserted if the radar reading contains a radar reading above the noise floor but not asserted if the pixel contains a radar reading below the noise floor. The radar sensor may comprise: a reference receiver, azimuth receiver and elevation receiver, and a respective transform block arranged to determine a spectrum of the reflections detected by each; a clutter compensation stage arranged, for each receiver, to determine a time-averaged version of the spectrum and subtract from a current, uncompensated instance of the spectrum to generate a compensated spectrum; and a reading derivation stage arranged to determine the azimuth angles of the readings by comparing the uncompensated spectrums of the azimuth receiver and reference receiver, to determine the elevations of the readings by comparing the uncompensated spectrums of the elevation receiver and reference receiver, and to determine the one or more measured properties based on one, more or all of the uncompensated spectrums; but wherein the noise floor is defined relative to the compensated spectrum.

In further embodiments, the image projection module may alternatively or additionally be configured to normalize the image before input to the machine learning model.

In some such embodiments, the normalization may comprise one or more of: a) normalizing azimuth angle by setting the azimuth angle of a closest reading in the set to zero and specifying all other readings in the set relative to that; b) normalizing the distance by setting the distance of a closest reading in the set to zero and all specifying other readings in the set relative to that; and/or c) normalizing the azimuth, elevation and distance to correct for warping.

In further alternative or additional embodiments, the system may be configured to repeat the projection for each of a plurality of sets of radar readings detected by the radar sensor, thereby producing a stack of images each from one of the sets. The machine learning model may be arranged to receive and perform the detection using the stack of images, based on the pixel values of the binary and non-binary channels in each of the images in the stack.

In an example application of any of the disclosed embodiments, the object which the machine learning model is configured to detect may comprise a person.

In an example implementation the machine learning model may comprise a neural network.

According to another aspect disclosed herein, there may be provided a method corresponding to any embodiment disclosed herein. According to another aspect there may be provided a computer program embodied on computer-readable storage (a non-transitory medium) and configured so as when run on one or more processors to carry out operations in accordance with any embodiment disclosed herein.

BRIEF DESCRIPTION OF THE DRAWINGS

To assist understanding of embodiments of the present disclosure and to show how such embodiments may be put into effect, reference is made, by way of example only, to the accompanying drawings in which:

FIG. 3 is a schematic block diagram of a radar sensor, FIGS. 4a to 4b give a schematic illustration of a set of 3D radar readings.

DETAILED DESCRIPTION OF EMBODIMENTS

Machine learning models for image recognition are typically designed to operate on conventional images produced by cameras employing optical image capture techniques, where a lens and image sensor array are able to systematically take readings across all elements of the sensor array. Typically each pixel comprises samples of multiple channels in a colour space, such as RGB (red, green and blue) or YUV (one luminance and two chrominance channels). All pixels in the image have a meaning; pixels that have a zero value, will mean that not enough light arrived to distinguish something. Where a zero value is sampled on all channels, this would be the result of the sample of a very weak ray of light being received by the camera's image sensor but quantizing to zero. Also, whilst a zero on one channel is perfectly normal (in RGB space red is represented with zero on the green and blue channels, or similarly 0 in U or V is normal for YUV), a zero on all channels occurs relatively infrequently in most images used in machine learning and image recognition applications.

Figure 1:
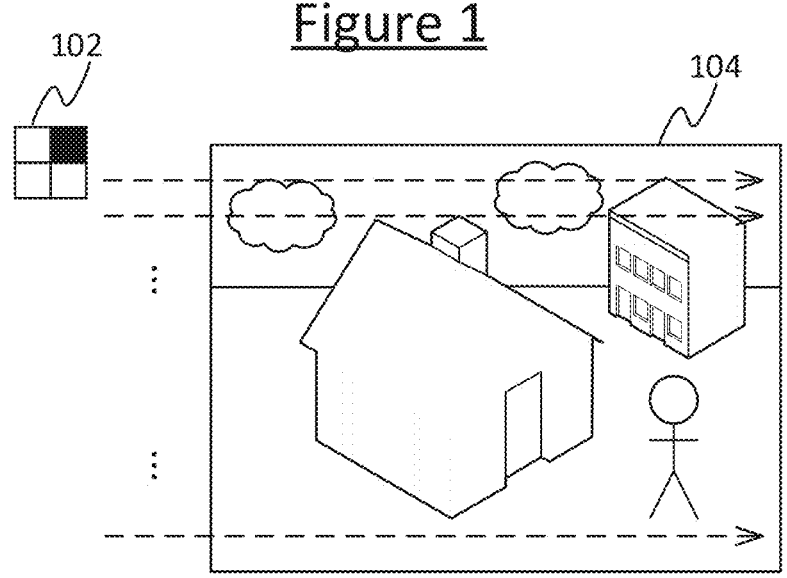
FIG. 1 is a schematic representation of the convolution of a kernel with a 2D image.

FIG. 1 shows an example of one conventional image recognition technique that may be employed by a machine learning model such as a neural network. One of the layers of the neural network may be configured to convolve a kernel 102 across an image 104. E.g. the kernel may comprise a 2×2 square of pixels with one pixel (e.g. top right in the example shown) having a maximum value in one of the colour-space channels and the other three pixels being zero in value. This will result in a spike in the output of the convolution when the kernel 102 crosses a corner in the image 104 (a lower-left corner in the example shown example), and hence the neural network can learn to detect corners. Other types of kernel can also be convolved with the image to help recognize other shapes, patterns or structures.

Radar readings on the other hand are typically generated in the form of vectors of azimuth, elevation and signal strength, each vector in a different respective distance (depth) bin. This data cannot be directly input into a standard machine learning model designed for conventional image recognition. Therefore it is disclosed herein to project such radar readings onto a 2D image plane to enable a machine learning model designed for image recognition to learn and make predictions based on radar.

A set of radar readings is typically much less densely populated with information. There are at least two reasons for this. Firstly, as the radar sensor typically only generates a relatively small number of readings, e.g. 256, per chip (one for each distance). For instance, say all of these may be in the right hand side of the image, the left hand side will have no readings. Secondly, there could be signals that are so low that they are below the noise floor, and they may be discarded those. However, over time a series of very faint blips around the noise floor could become significant as the noise floor averages out over time.

Due to the sparsity of data points, machine learning models designed for conventional image recognition applications may still not always perform well if a set of 3D radar readings is simply converted directly to a 2D image an input to the model. Therefore in embodiments further manipulation of the data may be applied to improve performance.

Figure 2:
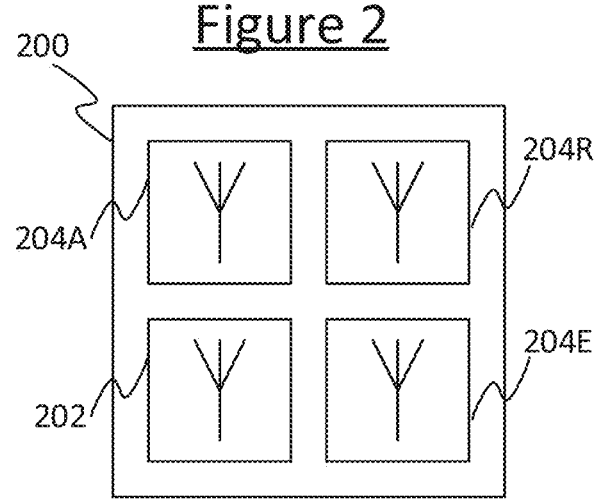
FIG. 2 is a schematic block diagram of radar antenna equipment.

FIG. 2 shows an example of the radar antenna equipment 200 of a radar sensor. The antenna equipment 200 comprises a plurality of constituent antennas 202, 204. These comprise a transmit antenna 202, and receive antennas 204. The receive antennas 204 comprise a reference antenna 204R, an azimuth antenna 204A, and an elevation antenna 204E. The three receive antennas 204A, 204R, 204ER are arranged at different physical positions, for example with the azimuth antenna 204 offset from the reference antenna 204R along one axis, and the elevation antenna 204E offset from the reference antenna 204R along another, orthogonal axis (an "L" shape). When a radar signal is emitted by the transmit antenna 202 and a reflection of that signal is received back by the three receive antennas 204, then the different physical positions of the different receive antennas 204R, 204A, 204E enables a determination of the direction of the reflected signal in terms of an azimuth angle φ and an elevation θ (or equivalently polar angle).

FIG. 3 shows an example of a radar sensor 300 that may be employed in embodiments of the present disclosure. This may take the form of a frequency modulated continuous wave (FMCW) radar sensor. The radar sensor 300 comprises the antenna equipment 200, a radar transmitter 302 coupled to the transmit antenna 202, and a respective radar receiver 304 coupled to each of the receive antennas 204; that is, a reference receiver 304R coupled to the reference antenna 204R, an azimuth receiver 304A coupled to the azimuth antenna 204A, and an elevation receiver 304E coupled to the elevation antenna 204E. The radar sensor 300 also comprises a reading derivation stage 312. The reading derivation stage 312 may optionally comprise a clutter compensation function 352.

Each radar receiver 304R, 304A, 304E comprises a respective mixer 306, a respective analogue-to-digital converter (ADC) 308, and a respective Fourier transform (FT) block 310 for performing a Fourier transform (e.g. a fast Fourier transform, FFT). More generally the latter could be a block for performing any form of transform to the frequency domain, e.g. a DCT (discrete cosine transform). The following will be exemplified in terms of Fourier transforms but it will be appreciated that this is not limiting and anywhere herein the Fourier transform could be replaced with any form of transform to a frequency domain.

The mixers 306 and ADCs 308 are implemented in dedicated hardware circuitry. The FT block 310 and reading derivation stage 312 (including any clutter compensation function 352) may be implemented in dedicated hardware circuitry, or in software stored in memory and run on one or more processors, or in a combination of hardware and software. Also, in a variant, the return signal could be converted to digital first and then put through a digital mixer, in which case the mixer 306 could be implemented in hardware or software.

The transmitter 302 is configured to generate, for each radar chirp, an outbound radio-frequency (RF) signal which it outputs to be broadcast as a radar signal via the transmit antenna 202 out into the environment being sensed. The outbound signal is a sinusoid with a frequency that, within each chirp, increases or decreases across a range of frequencies (thus scanning a range of frequencies per chirp). This radar signal may be broadcast in a range of different directions, preferably omnidirectionally.

Each receive antenna 204 receives back a return signal comprising one or more reflections of the broadcast radar signal. The mixer 306 in each receiver 304 is arranged to receive, as inputs, the outbound signal generated by the transmitter 302 and the return signal received by the respective receive antenna 204, which it mixes together to produce a beat signal having one or more beat frequencies. Each beat frequency is indicative of the distance, from the antenna equipment 200, of a certain reflection of the broadcast radar signal back to the antenna equipment 200. I.e. it is indicative of the distance of the surface in the environment from which the signal was reflected.

Figures 8, 9:
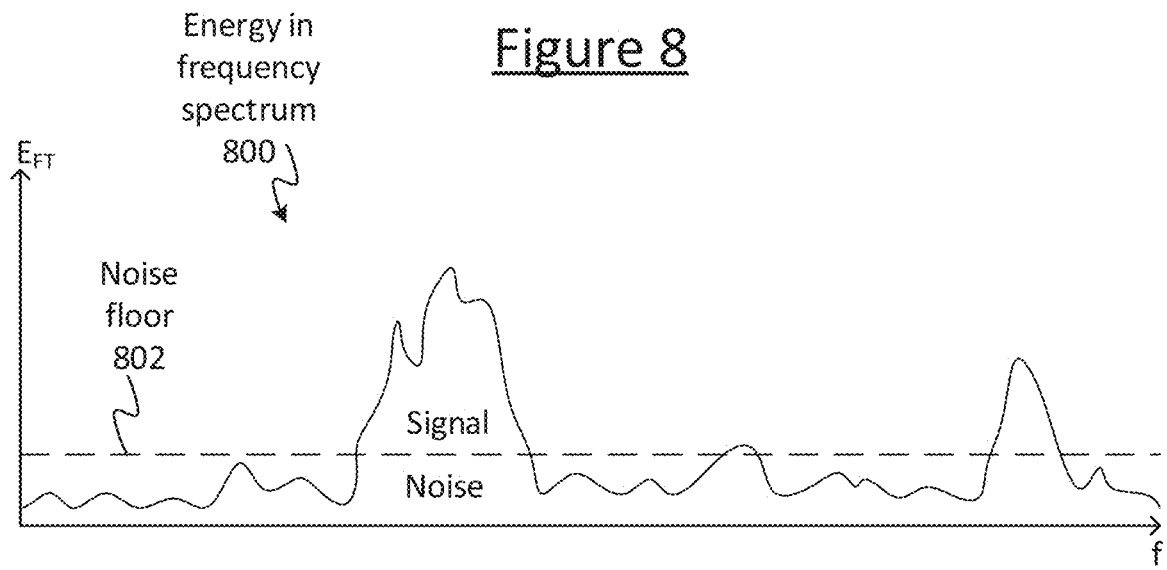
FIG. 8 is a schematic illustration of an energy in frequency spectrum, and FIG. 9 schematically illustrates a grid of pixels with binary and non-binary channel per pixel in accordance with embodiments disclosed herein.

The beat signal output by the mixer 306 in each receiver 304 is input to the respective ADC 308 to convert it to a digital signal, and then the digital version of the signal output by the ADC 308 is input to the respective FT block 310 to perform a Fourier transform (e.g. FFT) on the digital signal. The output of the Fourier transform performed by the FT block 310 comprises a frequency domain energy spectrum, which will include a component for each beat frequency in the respective beat signal, comprising a phase and amplitude of that component. A schematized example of such an energy spectrum 800 is shown in FIG. 8, were each peak corresponds to a beat component (e.g. a peak may be determined wherever the spectrum 800 rises above a noise floor threshold 802). Each beat frequency corresponds to a different respective distance r from which the radar signal was reflected back to the antenna equipment 200 of the sensor 300. The corresponding spectra from the FTs 310 of each of the reference receiver 304R, azimuth receiver 304A and elevation receiver 304E are input to the reading derivation function 312.

The reading derivation stage 312 is configured to identify the beat components in the energy spectra and based thereon, determine the difference between the phase of the component as detected by the azimuth receiver 304A and the phase of the component detected by the reference receiver 304R, for each component derived by the FTs 310 from the beat signals. This gives, for each distance from which a reflection was received, the azimuth angle ϕ of the reflection. The reading derivation stage 312 is also configured to determine the difference between the phase of the component as detected by the elevation receiver 304E and the phase of the component detected by the reference receiver 304R, for each component derived by the FTs 310 from the beat signals. This gives, for each distance from which a reflection was received, the elevation angle (or equivalently polar angle) θ of the reflection. The reading derivation stage 312 also takes, for each reflection distance, the amplitude of the component from one of the reference receiver 304R, azimuth receiver 304A or elevation receiver 304E (or a combination of two or more of these), which gives the strength p of the reflected signal.

Figure 4A:
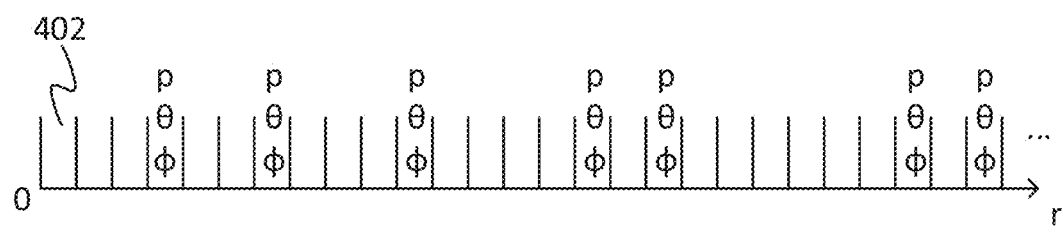

Thus the reading derivation stage 312 is able to output a set of readings, each in one of a plurality discrete distance bins corresponding to a possible quantized distance r from which a signal may be reflected from the environment back to the an antenna equipment 200. Each reading comprises a received direction of the signal reflected from that distance in terms of azimuth ϕ and elevation θ, and a received signal strength p of the reflection. This is illustrated schematically in FIG. 4*a*.

In embodiments each reading may also comprise a measure of motion of the target which cause the reflection. This measures a speed s or velocity v of the target, which may be determined from the Doppler effect. Note that the a window of multiple chirps including the current chirp and a plurality of past chirps going back from the current chirp are needed for a speed or velocity measurement. E.g. embodiments may use a set of 32 chirps; each comprising, say, 256 sampling points. The Doppler estimation will first run an FFT over the 256 sampling points. That gives 129 complex bins, then a FFT (or such like) is run in each bin over the 32 chirps, which gives 32×129 complex bins. Each of the 129 bins represents a distance value, each of the 32 values represents a velocity. It will be appreciated that these example parameters are just illustrative, and a skilled person will be familiar with how to implement a Doppler estimation with a desired accuracy for any given application. If there are fewer chirps, the estimation will still work but won't be as accurate. The more there are, the finer grained your velocity estimation.

In embodiments, the reading derivation stage 312 may comprise the clutter compensation function 352. In such embodiments, the clutter compensation function 352 may be configured to take a time-averaged version of the spectrum 800 (e.g. see again FIG. 8) from each of the azimuth, elevation and reference receivers 304A, 304E, 304R, averaged over a predetermined number of preceding radar chirps (e.g. the last 32 chirps). For the signal from which a current set of readings is to be determined, it then determines a compensated spectrum by subtracting the time-averaged spectrum from the current spectrum (again on each of the azimuth, elevation and reference branches 304A, 304E, 304R of the receive equipment 304). It is the compensated spectra of the azimuth, elevation and reference receivers 304A, 304E, 304R that are used to determine the beat components from which the set of readings is derived. The clutter compensation function 352 thus removes "background" noise, also referred to as clutter (though note that "background" in this sense does not necessarily mean spatially in the background of the image or environment—clutter could also come from the spatial foreground).

Alternatively, or additionally, the reading derivation stage 312 may be configured to apply a noise floor 802 to the spectrum on each branch. The noise floor is a lower threshold, below which any part of the spectrum is considered noise. This means, in order to be declared a "component" for the purpose of deriving the radar readings, a peak in the spectrum must be greater than the noise floor 802. In the case where both clutter removal and a noise floor are employed, the noise floor 802 may be applied to the compensated version of the spectrum 800 (after the time averaged spectrum is removed).

As another alternative or additional compensation, the reading derivation stage 312 may be configured to apply range normalisation to compensate the round trip path loss which is proportional to range to the power of 4.

Figure 4B:
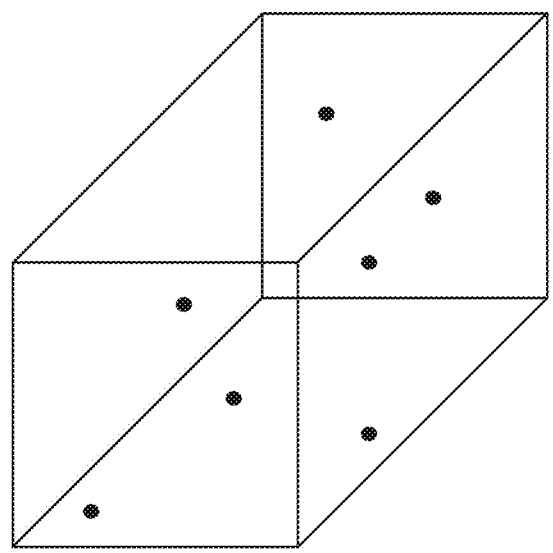

Note that if clutter or signals below a noise floor are removed, then only some of the distance bins 402 are occupied with readings. The distance bins 402 represent quantized distances from which it is possible to receive reflected signal. A reading {ϕ, θ, p} in one of those bins 402 represents the detection of an actual reflection from the distance represented by that bin. If no measurable reflection was received from the distance of a given bin, then that bin will contain no reading. As shown in FIG. 4*b*, the set of readings could be thought of as a 3D plot. Note how the set will typically contain only a sparse spattering of detected points compared to the range of the 3D space in which the sensor can potentially detect reflection.

Radar systems in general are thus designed to detect and measure parameters of a "target" through transmitting known RF waveforms and then receiving and processing the signals reflected back from the target. All received signal levels depend on the "radar cross section" (RCS) of the object, target or clutter, a joint measure of reflectivity and effective "surface area". The RCS is effectively the composite of one or more scattering centres (Keller, 1962). These are viewed as point sources on the reflecting surface and, given suitable receive antenna array geometries, the position of these can be estimated in 3D space by comparison of received phase and the estimate of range to the scattering centre (its transmission time delay). This can yield a set of received intensities {p} at co-ordinates {x, y, z} from each {r, θ, ϕ} for each respective radar measurement or chirp.

A problem here is that the data from a radar is very sparse relative to optical images. For example, even with a relatively low resolution a VGA image sensor, there are 640× 480 pixels, each representing the light level or colour of a particular direction from the camera. That is, for each discrete direction there is a value. The number of pixels is orders of magnitude higher than the typical number of radar readings obtained from a radar chip.

Both optical and radar systems may also suffer from occlusion, i.e. that there are two objects behind each other, and the first object obscures the second object.

Radar sensors do not produce a measurement for each direction, but instead produce a measurement for each distance. A state-of-the art radar sensor may have 256 distance bins, and for each distance bin the radar sensor reports an azimuth, an elevation, and a strength of the reflection. For very weak reflections the elevation and azimuth have little meaning, and they can be ignored. As there is only one azimuth, elevation and strength for each distance, two objects can obscure each other if they are at the same distance (even if located in different directions, unlike with optical image sensing).

If one were to display a radar reading as an image, then only a very sparse image would be obtained. E.g. compared to having 640×480=307,200 measurements, then with a radar sensor with 256 distance bins for example, there would be at most only 256 measurements that are scattered throughout the field of view. Even for sensors with 512 or 1024 distance bins, this is still only a fraction of the total number of pixels. Note also that some of the readings may also fall in the same pixel. Furthermore, if clutter removal and/or a noise floor are applied, then this will reduce the number of readings even further (refer again to FIG. 4 and the associated discussion).

This sparsity means that it is difficult to use existing machine learning (ML) techniques that have been designed for image processing. The following discloses a technique for interpreting the radar data in such a way so that ML techniques for image processing can be better used on radar data.

Figure 5:
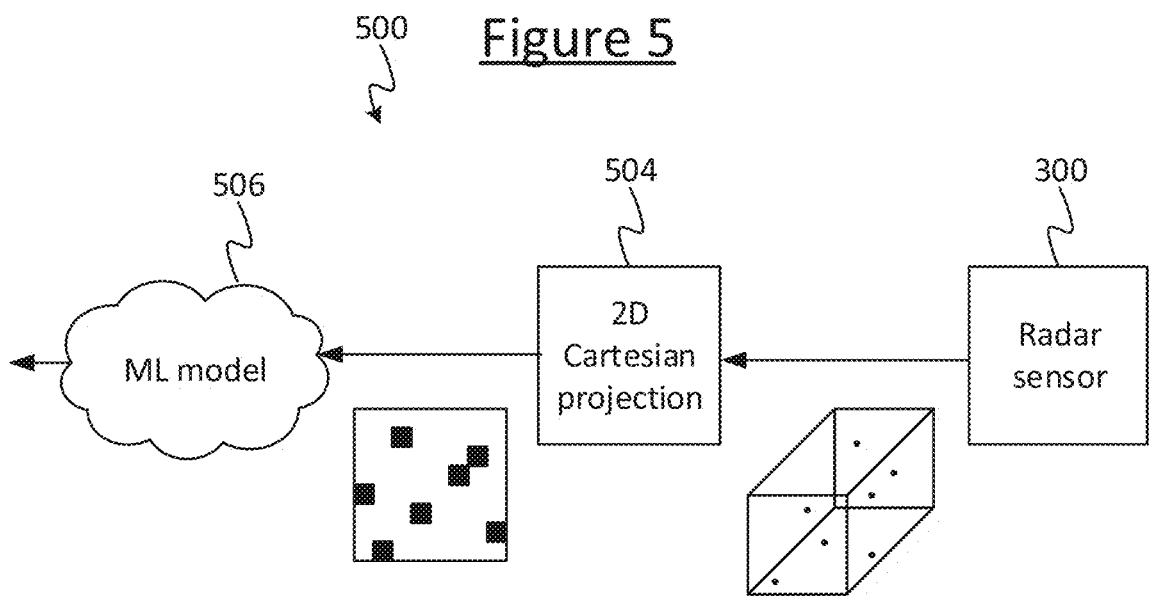
FIG. 5 is a schematic block diagram of a system in accordance with embodiments disclosed herein.

FIG. 5 shows an example system 500 and corresponding method in accordance with embodiments disclosed herein. The system 500 comprises the radar sensor 300, an image projection module 304, a machine learning (ML) model 506, and an optional pre-processing stage 302. The machine learning model 506 and image projection module 504 may be implemented in software stored in memory and run on one or more processors, or may be implemented in dedicated hardware circuitry, or a combination of hardware and software.

Note also that where a software implementation is used for any element disclosed herein, the memory on which the software is stored may comprise one or more memory units in one or more integrated circuit (IC) packages and/or physical housings at one or more geographical sites. Similarly the one or more processors on which the software is run may be implemented in one or more IC packages and/or physical housings at one or more geographical sites. Also it is not essential that the different elements disclosed herein, such as the ML model 506 and image projection module 504, or image projection module 506 and radar sensor 300, are necessarily implemented in the same IC package, housing or geographic site. Distributed cloud computing techniques for networking together different memory units and/or processors to perform a cooperative task are, in themselves, known in the art.

By whatever means implemented, the image processing module 304 is arranged to receive the detected set of radar readings (e.g. as shown schematically in FIG. 4a or 4b) from the radar sensor 300. The clutter compensation function 352, if used, may be configured to remove background clutter and/or other artefacts from the signals used to derive the radar readings before input to the image projection module 304. The image projection module 304 is configured to project the 3D spherical polar coordinates of the radar readings onto a 2D Cartesian image. Geometric transforms for doing this will, in themselves, be understood by a person skilled in the art. For example the projection may be a parallel projection. This could be visualized by saying that, if the "picture frame" is the height and width coordinates (y,z) (depending on convention), then each reading is "dropped" down onto the pixel in the frame or image above which the reading lies along the direction perpendicular to the plane of the image or frame (e.g. x direction).

Each occupied pixel in the image (i.e. each pixel in which a radar reading happens to fall) will have an associated value of the distance channel (r), signal strength channel (p) and/or motion channel (s or v). In embodiments at least the distance r and strength are used.

In addition, in accordance with embodiments disclosed herein, the image projection module 304 may be configured with an additional function. That is, it is configured to augment each pixel with a value of an additional, binary channel. This binary channel conveys a binary indicator (or "flag") which indicates whether or not that pixel corresponds to a radar reading. The binary indicator is preferably a single bit, though note that the terminology as used herein does not exclude a work-around whereby more than one bit is used to represent the same yes/no (asserted/not asserted) information. Binary in this sense means the information conveyed is binary (yes/no), and does not necessarily limit the way in which this information is represented in software or circuitry.

The resulting image, including the pixels values of the conventional channels and the additional binary channel, is then output by the image projection module 504 to the machine learning (ML) model 506. The machine learning model 506 is configured to learn to perform image recognition based on the pixel values of the received image, including learning the effect of the extra binary channel. The ML model 506 may for example comprise a neural network, which learns by tuning weights of nodes in the neural network based on the input experience data (in this case the 2D images from the image projection module 504). However the scope of the present disclosure is not limited to neural networks, and other forms of machine learning model are also known in the art, such as clustering algorithms.

After removal of background clutter and other artefacts, to facilitate detection using tried and tested machine learning techniques rather than use 3D point clouds, these sets of points per chirp can be mapped to a 2D image. If the x coordinate denotes distance along the floor to the target, y coordinate denotes distance either side of the direction the radar antenna is pointing and z denotes height above the ground, the y and z coordinates can be used to index a rectangular or square grid of pixels, say 32 by 32 or 128 by 128, and populate this array with the measured intensity in the corresponding pixel.

This will be a sparse image, but to enable ML techniques to learn on this, an extra channel has been added to the image that states whether this element of the grid has a value or not. In embodiments, this will give at least three channels for the image:

i. Pixel contains a measurement (1), or pixel contains no measurement (0)
  ii. Depth of measurement (r), or 0 if no measurement
  iii. Energy of reflection (p), or 0 if no measurement Thus there is provided a system that discretises the angles of the radar readings to make an image, fills the image, and adds a channel that says whether this pixel contains information or not. This channel could be called "measurement present" or "reading present" channel, labelled b. It is a binary (Boolean) channel, i.e. each pixel has a binary (yes/no) value of this channel.

The rationale behind this is that the value '0' in the depth plane is an extreme measurement, but by providing a 0/1 in the 'contains-a-measurement' plane, the system can enable the ML algorithm to selectively ignore measurements.

Figure 6:
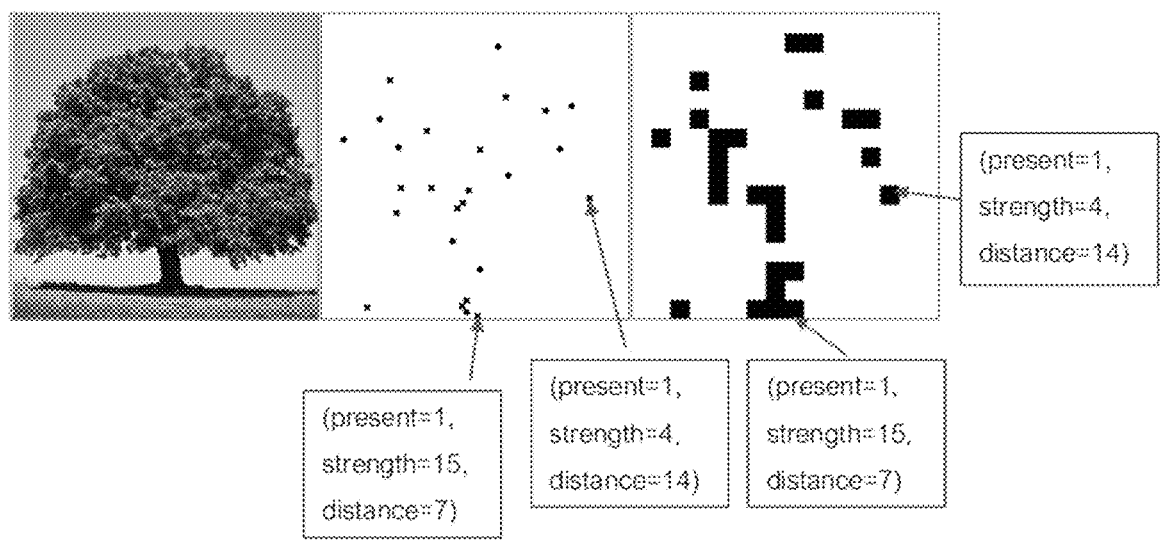
FIG. 6 shows an example of a 2D projection of a set of radar readings.

As an example, consider a tree, seen with an image sensor and a radar sensor. FIG. 6 visualises the three outputs: (left) a corresponding image from an image sensor, (middle) a 64×64 image projected from the readings of the radar sensor 300, and (right) a 16×16 image projected from the readings of the radar sensor. In the latter two, white pixels are used to indicate pixels with no measurements, and black squares as data with a measurement. A few example measurements are shown for these two The three channels or "planes" of the radar-generated image (b, r, p) can be likened to the RGB or YUV planes of a colour image. Indeed, more planes can be added to for example measure velocity, etc. Similar to YUV or RGB images, each of the planes carry complementary information, as follows.

The fact that a measurement is present in a plane gives information about the geometric outline of the object. This information may also be used to gate other operations in the machine learning model 506.

the strength of a reflection gives information about the orientation of the object and the type of material.

The distance of the object gives us a 3D shape of the object in view

For instance the machine learning model 506 can learn a convolution around a corner, such as a shoulder of a person, but only if that information is there in one of the channels of the image. The inventors have found that the additional binary (Boolean) channel b greatly increases the prediction accuracy and speed of learning of a machine learning model, even using an "off-the-shelf" model designed for image recognition.

To illustrate the point, refer by way of example to FIG. 9. This shows a set of radar readings projected onto a 4×4 pixel grid (in practice the grid may be larger, but this is shown by way of illustration). In this example each pixel comprises a value of the binary channel b and a value of the signal strength channel p. Pixels that have no radar reading mapped to them have a binary channel value b=0, and signal strength p=0. Pixels that do have a radar reading mapped to them have a binary channel value b=1. Each of these pixels have a non-zero signal strength value p, but some of them may have a very low value. E.g. one shown in FIG. 9 has p=1 (say on a scale of 0 to 1023). Without the binary channel b, if this data was input to the machine learning model 506, it may learn form the data as of a pixel of value p=1 is almost the same as p=0 on the same continual scale. However, the distinction may in fact be significant, and the fact that there was a radar reading detected there. This is illustrated by way of example in FIGS. 4a and 4b, where the approximate shape of an object (outlined in bold) is revealed by a reading in the centre of the object with weak signal strength (in this example p=1).

Or consider a scenario where each pixel instead comprises only a distance (r) and/or motion channel (speed s or velocity v). In this case pixels with no radar reading, and pixels with a radar reading from a target at zero distance or a stationary target, would both have a value of r=0 and/or s or v=0. These would be completely indistinguishable to the machine learning model 506, even though the distinction may be significant. By including the binary channel b, this informs the model 506 of the difference between the two categories of pixel and enables it to learn based on this distinction.

In general, the non-binary channels used could include any combination of distance (r), signal strength (p), motion (s or v), and/or any other property that may be derived from the reflected radar signals (e.g. another example would be variance of distance, signal strength or motion).

Regarding the size of the pixel grid used (the resolution, i.e. number of pixels), there is a balance to be struck between sparsity and over-quantization in space. If too high a resolution is used (say 640×480 as in VGA), then the pixels containing radar readings will tends to be very sparse compared to the number of pixels in the image (given that conventional radar sensors tend to have something of the order of 256, 512 or 1024 distance bins). This may affect the ability of a machine learning model 506 (designed for ordinary, densely-populated optical images) to recognized structure in the image. On the other hand if the resolution used is too low (say 4×4 pixels), then any structure will also tend to be lost as most objects will tend to just look like a 2×2 square in the centre of the image, or such like. The inventors have found that a sweet spot is around 16×16 to 128×128 pixels, more preferably 32×32 to 64×62 pixels, though other combinations are of course possible.

As an optional extension, the image projection module 504 may also be configured to perform one or more normalizations on the image before it is input to the machine learning model 506.

If one is interested in tracking a particular target, for example a human or animal walking around, then it may be desirable to normalise the information in the image. For example, the image projection module 504 may be configured to find the first point of contact (the nearest point that has a strong reflection), and use that to:

rotate the 3D coordinates so that the target appears centred in the image, and/or normalise the distance so that the nearest distance is always at a specific point, and/or normalise the azimuth, elevation, and distance to correct for the warping that occurs when an object gets nearer, by translating them to x, y, and z coordinates. The nearer an object is, the larger the perceived difference in distance to toes, head, and waist line, the larger the angle in elevation (and azimuth), and the stronger the reflections appear.

Normalisation of depth comprises setting the closest point of contact (closes distance measurement in the set) to d=0, and setting all other distance measurements relative to this. The rotation normalization comprises taking the angle of the closest point of contact as a zero azimuth, and rotate all the other points by this angle.

When things are far away, the elevation and azimuth are approximately the X and Y values, but the closer the target gets, the less this approximation is true (as discussed previously the actual projection can be determined for example by means of a parallel projection). If very close, a person's waist (for example) may only be 1 inch away from the sensor, but their chin and toes are a few feet away from the sensor. Ideally, these distances are all mapped to a distance of 1 inch, as by multiplying the distance by the cosine of the azimuth and elevation. This also means that the X and Y used are 1/cos(azimuth) and 1/cos(elevation).

The distance warping crowds scattering centres together so they may start to be in each other's bins as the target object gets further away, distorting measurement.

As another optional, alternative or additional extension, the image projection module 504 may be configured to crop the image or set of points, either before or after the 2D projection, before input to the machine learning model 506. This may be done to removed regions outside of a particular region of interest, for example an area at the centre of the image or an area around the point of strongest reflection. Or some cropping may be desirable anyway, because the input image is a fixed size. After converting the polar coordinates that the radar yields into cartesian x, y, z; then if (say) x is width, y is height and z is depth, the x and y are mapped to 32×32 pixels representing (say) a 2 m by 2 m 2D flat surface without warping (e.g. on the basis that very few people are >2 m tall or 2 m wide). Alternatively, given that the image is of a fixed size, the image projection module 504 may produce a border around the image that contains all the rays that couldn't otherwise fit in the image.

As another optional, alternative or additional extension, further channels can be added to the image, encoding other properties of each measurement. For example, a doppler-measurement can be made to work out what speed a particular part of the image is moving at, and this could be added as a fourth channel.

As yet another optional, alternative or additional extension, more than one image may be created and input to the machine learning model. In this case the radar sensor performed N radar chirps and outputs the results of each to the image projection module 504 (optionally via pre-processing stage 502), to produce a corresponding N 2D images, each based on the techniques discussed above. Thus the machine learning model 506 can learn based on a stack of N images, each corresponding to a different point in time at which the corresponding set of radar readings was captured.

For instance, the 32×32×N planes chirp "image" can be compared to others in a sequence where the target is moving to examine time between repeated poses which might provide discrimination between targets.

Given a set of M×N×P images derived from a radar chirp—a neural network can be trained using these images in a manner analogous to picture recognition where instead of have RGB channels there the planes described above are the "channels". Classifier networks may be trained using chirp data captured from the set of people to identify later after computing the images with planes as described. The network may take one or more of the planes described for training and prediction.

Some example applications of any of the above techniques include the use of radar to determine which person of a previously seen set is in the room, car etc. The techniques can also be used to discriminate other classes of objects.

Figure 7A:
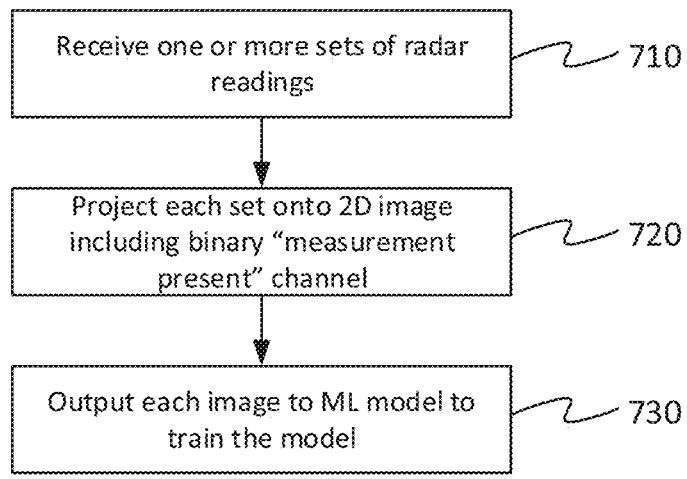
FIGS. 7a and 7b is a flow chart of a method disclosed herein.

FIG. 7a gives a flow chart of a method that may be performed by the image projection module 504 in an initial learning phase. At step 710 the method comprises receiving one or more sets of radar readings from the radar sensor 300, each set comprising a reading of azimuth, elevation and optionally received signal strength in one or more distance bins. At step 720 the method comprises converting each of the one or more sets into a corresponding 2D image, including a value of a binary "reading present?" channel for each pixel in the image that maps to one of the radar readings. At step 730 the method outputs the one or more sets of readings to the machine leaning model 506 in order to train the model. E.g. the training may comprise tuning weights in the case of a neural network.

Figure 7B:
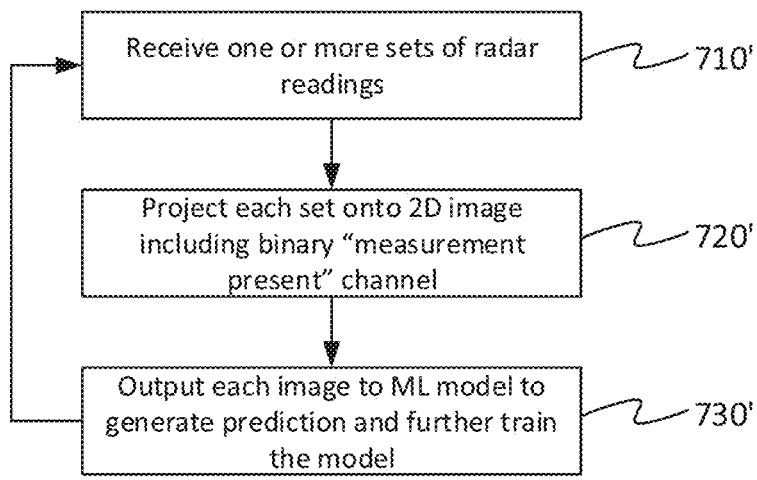

FIG. 7b gives a flow chart of a method that may be performed by the image projection module 504 in a subsequent prediction phase, where the model 506 is used to make a prediction (e.g. detect or identify an object). At step 710' the method comprises receiving one or more sets of radar readings from the radar sensor 300, each set comprising a reading of azimuth, elevation and optionally received signal strength in one or more distance bins. At step 720' the method comprises converting each of the one or more sets into a corresponding 2D image, including a value of a binary "reading present?" channel for each pixel in the image that maps to one of the radar readings. At step 730' the method outputs the one or more sets of readings to the machine leaning model 506 in order to cause the model 506 to generate a prediction based on the 2D image converted from the radar readings (e.g. object identification). This may sometimes also be called an inference. Optionally the method may loop back from step 730' to step 710' to continue training the model 506 based on one or more further sets of readings. In embodiments the method may continue to loop like this so as to train the model in an ongoing manner.

It will be appreciated that the above embodiments have been described by way of example only. Other variants or use cases of the disclosed techniques may become apparent to the person skilled in the art once given the disclosure herein. The scope of the disclosure is not limited by the described embodiments but only by the accompanying claims.

The invention claimed is:

1. A system comprising:
   a radar sensor configured to emit a radar signal and receive back reflections thereof, and thereby produce a set of radar readings distributed amongst a plurality of distance bins each corresponding to a different respective distance of reflection, wherein in each distance bin that contains a radar reading, the radar reading comprises at least a respective azimuth angle and elevation of the radar reading;
   an image projection module configured to project at least some of the radar readings onto an image comprising a 2D Cartesian grid of pixels based on the respective azimuth angles and elevations, wherein for each pixel where a radar reading is present the pixel comprises a respective value of at least one non-binary channel comprising at least one of measured property of the radar reading and a respective value of a binary channel comprising a binary indicator,
      wherein the binary indicator is asserted if the pixel contains one of the radar readings but not asserted otherwise, or
      the binary indicator is asserted if the radar reading contains a radar reading above a noise floor but not asserted if the pixel contains a radar reading below the noise floor; and
   a machine learning model for image recognition, arranged to receive the image and to detect an object therein, wherein the machine learning model is configured to perform the detection based on at the values of the binary and non-binary channels for each pixel, including pixels with both asserted and non-asserted values of the binary channel.

2. The system of claim 1, wherein the at least one measured property of the radar reading comprises one, more or all of:
   the respective distance of the radar reading,
   a signal strength of the received reflection which produced the radar reading, and/or
   a motion measurement comprising a speed or velocity of a surface from which the radar signal was reflected to produce the radar reading.

3. The system of claim 2, wherein the at least one non-binary channel comprises at least the distance.

4. The system of claim 2, wherein the at least one non-binary channel comprises at least the signal strength.

5. The system of claim 2, wherein the at least one non-binary channel comprises at least the motion measurement.

6. The system of claim 1, comprising a clutter compensation stage arranged to remove clutter from the set of radar readings before input to the image projection module to produce said image.

7. The system of claim 1, wherein the radar sensor comprises:
- a reference receiver, azimuth receiver and elevation receiver, and a respective transform block arranged to determine a spectrum of the reflections detected by each;
- a clutter compensation stage arranged, for each receiver, to determine a time-averaged version of the spectrum and subtract from a current, uncompensated instance of the spectrum to generate a compensated spectrum; and
- a reading derivation stage arranged to determine the azimuth angles of the readings by comparing the compensated spectrums of the azimuth receiver and reference receiver, to determine the elevations of the readings by comparing the compensated spectrums of the elevation receiver and reference receiver, and to determine the one or more measured properties based on one, more or all of the compensated spectrums.

8. The system of claim 1, wherein the binary indicator is asserted if the radar reading contains a radar reading above the noise floor but not asserted if the pixel contains a radar reading below the noise floor, and wherein the radar sensor comprises:
- a reference receiver, azimuth receiver and elevation receiver, and a respective transform block arranged to determine a spectrum of the reflections detected by each;
- a clutter compensation stage arranged, for each receiver, to determine a time-averaged version of the spectrum and subtract from a current, uncompensated instance of the spectrum to generate a compensated spectrum; and
- a reading derivation stage arranged to determine the azimuth angles of the readings by comparing the uncompensated spectrums of the azimuth receiver and reference receiver, to determine the elevations of the readings by comparing the uncompensated spectrums of the elevation receiver and reference receiver, and to determine the one or more measured properties based on one, more or all of the uncompensated spectrums; but wherein the noise floor is defined relative to the compensated spectrum.

9. The system of claim 1, wherein the image projection module is further configured to normalize the image before input to the machine learning model.

10. The system of claim 9, wherein the normalization comprises one or more of:
- normalizing azimuth angle by setting the azimuth angle of a closest reading in the set to zero and specifying all other readings in the set relative to that;
- normalizing the distance by setting the distance of a closest reading in the set to zero and all specifying other readings in the set relative to that; and/or
- normalizing the azimuth, elevation and distance to correct for warping.

11. The system of claim 1, configured to repeat the projection for each of a plurality of sets of radar readings detected by the radar sensor, thereby producing a stack of images each from one of the sets; wherein the machine learning model is arranged to receive and perform the detection using the stack of images, based on the pixel values of the binary and non-binary channels in each of the images in the stack.

12. The system of claim 1, wherein the object which the machine learning model is configured to detect comprises a person.

13. The system of claim 1, wherein the machine learning model comprises a neural network.

14. The system of claim 1, wherein the plurality of bins are between 64 and 256 bins in number, and the grid of pixels is between 16×16 and 128×128 pixels in size.

15. The system of claim 14, wherein the grid of pixels is between 32×32 and 64×64 pixels in size.

16. A method comprising:
- using a radar sensor to emit a radar signal and receive back reflections thereof, and thereby produce a set of radar readings distributed amongst a plurality of distance bins each corresponding to a different respective distance of reflection, wherein in each distance bin that contains a radar reading, the radar reading comprises at least a respective azimuth angle and elevation of the radar reading;
- projecting at least some of the radar readings onto an image comprising a 2D Cartesian grid of pixels based on the respective azimuth angles and elevations, wherein for each pixel where a radar reading is present the pixel comprises a respective value of at least one non-binary channel comprising at least one of measured property of the radar reading and a respective value of a binary channel comprising a binary indicator, wherein the binary indicator is asserted if the pixel contains one of the radar readings but not asserted otherwise, or
- the binary indicator is asserted if the radar reading contains a radar reading above a noise floor but not asserted if the pixel contains a radar reading below the noise floor; and
- using a machine learning model designed for image recognition, to receive the image and to detect an object therein, wherein the machine learning model performs the detection based on the values of the binary and non-binary channels for each pixel, including pixels with both asserted and non-asserted values of the binary channel.

17. The method of claim 16, wherein the at least one measured property of the radar reading comprises one, more or all of:
- the respective distance of the radar reading,
- a signal strength of the received reflection which produced the radar reading, and/or
- a motion measurement comprising a speed or velocity of a surface from which the radar signal was reflected to produce the radar reading.

18. The method of claim 16, wherein:
- the radar sensor comprises a reference receiver, azimuth receiver and elevation receiver, and a respective transform block arranged to determine a spectrum of the reflections detected by each;
- the method comprises, for each receiver, determining a time-averaged version of the spectrum and subtract from a current, uncompensated instance of the spectrum to generate a compensated spectrum; and
- the azimuth angles of the readings are determined by comparing the compensated spectrums of the azimuth receiver and reference receiver, the elevations of the readings are determined by comparing the compensated spectrums of the elevation receiver and reference receiver, and the one or more measured properties are determined based on one, more or all of the compensated spectrums.

19. The method of claim 16, wherein:

the binary indicator is asserted if the radar reading contains a radar reading above the noise floor but not asserted if the pixel contains a radar reading below the noise floor;

the radar sensor comprises a reference receiver, azimuth receiver and elevation receiver, and a respective transform block arranged to determine a spectrum of the reflections detected by each;

the method comprises, for each receiver, determining a time-averaged version of the spectrum and subtract from a current, uncompensated instance of the spectrum to generate a compensated spectrum; and the azimuth angles of the readings are determined by comparing the uncompensated spectrums of the azimuth receiver and reference receiver, the elevations of the readings are determined by comparing the uncompensated spectrums of the elevation receiver and reference receiver, and the one or more measured properties are determined based on one, more or all of the uncompensated spectrums; but wherein the noise floor is defined relative to the compensated spectrum.

20. A non-transitory computer-readable medium or media having a computer program stored thereon, the computer program being configured to implement, using one or more processors, operations comprising:

receiving a set of radar readings distributed amongst a plurality of distance bins each corresponding to a different respective distance of reflection, wherein in each distance bin that contains a radar reading, the radar reading comprises at least a respective azimuth angle and elevation of the radar reading;

projecting at least some of the radar readings onto an image comprising a 2D Cartesian grid of pixels based on the respective azimuth angles and elevations, wherein for each pixel where a radar reading is present the pixel comprises a respective value of at least one non-binary channel comprising at least one of measured property of the radar reading; and using a machine learning model to receive the image and to detect an object therein, wherein the machine learning model performs the detection based on at the values of the at least one non-binary channel for each pixel.

* * * * *